Oct. 27, 1953

E. WOLF 2,656,995

MULTIPOSITION CASTER LOCK FOR AIRPLANE
CROSS-WIND MAIN LANDING WHEELS
Filed May 9, 1951

INVENTOR.
Edward Wolf

BY
AHOldham
ATTORNEY

Patented Oct. 27, 1953

2,656,995

UNITED STATES PATENT OFFICE 2,656,995

MULTIPOSITION CASTER LOCK FOR AIRPLANE CROSS-WIND MAIN LANDING WHEELS

Edward Wolf, Cuyahoga Falls, Ohio, assignor to Goodyear Aircraft Corporation, Akron, Ohio, a corporation of Delaware Application May 9, 1951, Serial No. 225,293

5 Claims. (Cl. 244—103)

This invention relates to self-castering airplane cross-wind landing wheels and in particular to a locking device for preventing castering action of the wheels at a multiplicity of positions.

Hitherto it has been known to provide self-castering airplane main landing wheels having a limited caster angle with spot type slip brakes disposed at the outer end of the wheel axle, whereby a cylindrical friction block inserted into the axles is forced by spring pressure against a drum to dampen wheel shimmying when the airplane rolls on the ground. Under such conditions deviation of an airplane from its prescribed course can be readily corrected by the pilot. However, when steering an airplane, for instance, by electronic beam control, positive steering of the airplane on the ground would not be possible with slip brakes only.

It is the general object of the invention to avoid and overcome the foregoing and other difficulties of and objections by the provision of means for locking the wheels in substantially any castered positions which may be assumed after an airplane landing.

Another object of the invention is to provide a braking device which normally permits castering of the landing wheels while damping shimmying and is also capable when desired to lock these wheels at substantially any one of multiple positions the wheels may assume in castered position after touching ground.

The aforesaid objects of the invention, and other objects which will become apparent as the description proceeds are achieved by adding to a spring loaded frictional damping device disposed at the end of the landing wheel axle, as shown in Patent No. 2,504,077, issued to Oscar W. Loudenslager, a fluid pressure operated piston capable of locking the wheel against castering substantially in any position. Thus the wheel can caster while a sufficiently large frictional force is applied to dampen shimmying and is locked against castering when fluid pressure, preferably hydraulic pressure, is supplied to the damping device.

For a better understanding of the invention reference should be had to the accompanying drawing wherein.

Figure 1:
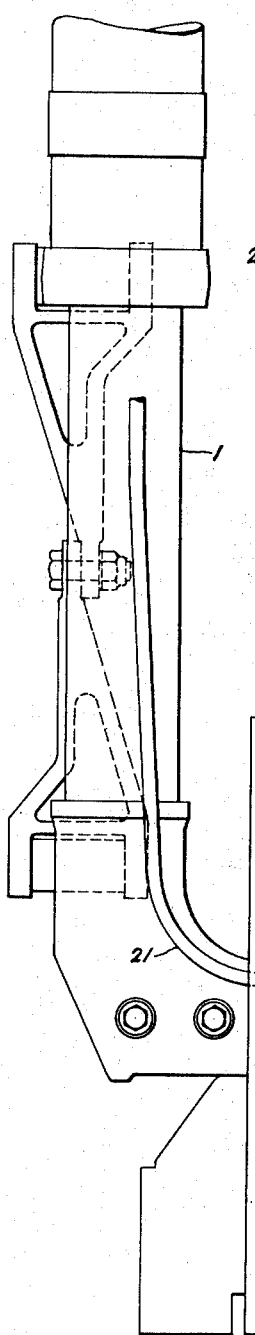
Fig. 1 is a general fragmentary front view of one embodiment of the invention being partly shown in cross-section.
Figure 2:
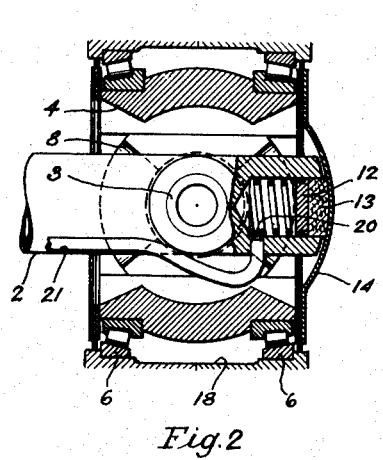
Fig. 2 is a fragmentary cross-sectional view taken substantially on line II—II of Fig. 1.
Figure 3:
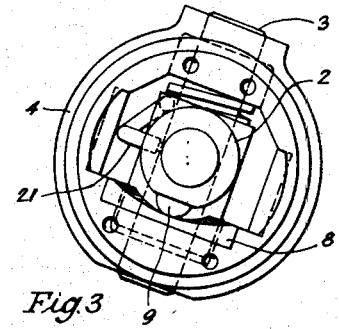
Fig. 3 is a side view of the wheel hub with bearings omitted.

With specific reference to the drawing the numeral 1 indicates an airplane oleo landing strut having attached to the bottom thereof an axle 2 through which slidably passes a king pin 3 mounted in a hub 4 radially spaced from the axle 2 and carrying a landing wheel 5 by bearings 6. The king pin 3 is positioned substantially at right angle to the wheel axle 2 in the center plane of the wheel and with its longitudinal axis intersecting the ground at a point forward of the wheel ground contact. A compression spring 7 housed in the hub 4 and being concentric to the king pin 3 forces, when the wheel is off ground, cam 8 seated within and at the bottom of hub 4 against a pair of cam followers 9 attached to the bottom of wheel axle 2, whereas when the wheel is on ground the airplane load is carried directly by cam 8. The end of axle 2 is provided with a bore forming a pressure cylinder 10 in which is movable a piston 11 sealed by ring 12 against cylinder 10. On the outer side of piston 11 is seated a friction pad 13 in contact with brake drum 14 fastened to the hub 4 by bolts 15 against a sealing disc 16 having a sheet metal support 17 to seal the hub housing 18 of wheel 5 against admittance of foreign matter. The piston 11 is always forced by spring 19 against the brake drum causing sufficient friction between pad 13 and brake drum 14 to dampen shimmying of the wheel when the airplane moves on the ground.

So far, this arrangement, without the piston, is shown in the above-mentioned patent, of which the following is an improvement.

In order to make it possible to positively steer an airplane on the ground, the cylinder 10 is provided with an inlet 20 connected by a hydraulic pressure line 21 to a control valve (not shown) which, not being part of the invention, may be manually operated at will by the pilot or in well-known manner by the motion of the strut during ground contact of the wheels at an airplane landing. By doing so, the hydraulic pressure applied to the cylinder 10 causes the wheels to be locked in substantially the position which they assume during a landing touchdown. This locking of the castered wheel permits the airplane to be positively steered at any caster angle just as is the case with a conventional non-casterable landing wheel.

Figure 5:
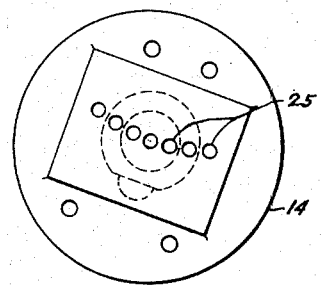
Fig. 5 is a side view of the brake drum of Fig. 4.
Figure 4:
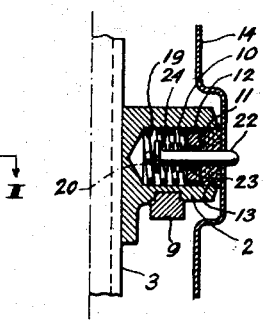
Fig. 4 is a modification of the invention showing a fragmentary axial cross-sectional view, similar to that of Fig. 1, of the wheel axle end.

In the modified construction, shown in Figures 4 and 5, the piston 11, under load of spring 19, is provided in its center with a flanged locking pin 22 movable in the piston and being sealed thereagainst by a packing ring 23. The pin 22, shown in locked position is ordinarily kept in retracted position by spring 24, but is forced outwardly to register with one of closely spaced holes 25 in the brake drum 14 after castering of the wheel has taken place and hydraulic pressure is applied to the cylinder 10 to hold the wheel fixed against castering. The vertical positions of the holes 25 are placed to correspond to the curvature of cam 8. With the pressure off from pin 22 it is retracted from its hole so that spring 19 becomes active again for damping wheel shimmying. Two springs are being used in this arrangement, one for disengaging the lock pin from the brake drum after fluid pressure is released from the cylinder, and the other to provide the necessary friction force to dampen wheel shimmying. Although not giving the infinite adjustment of the friction lock described above, the effect is for practical purposes the same.

Having described the invention, it will be understood that the objects of the invention, to hold the landing wheels in a fixed castered position, have been achieved in a most simple and practical way.

While certain representative embodiments and details have been shown for the purpose of illustrating the invention, it will be apparent to those skilled in the art that various changes and modifications may be made therein without departing from the spirit or scope of the invention.

What I claim:

1. In an airplane cross-wind landing gear, a strut having at its bottom a wheel axle attached thereto, said axle being provided at its outer end with a bore forming a caster brake cylinder, a king pin disposed at an angle with the horizontal and being axially slidable and pivotable in said axle, a hollow wheel hub fixed to said pin and being radially spaced from said axle, a wheel rotatably mounted on said hub and being freely casterable about said pin, a cam within and being seated at the bottom of said hub, a pair of cam followers fixed to the bottom of said axle in contact with said cam, a spring concentric with the king pin and seated on said axle for centering the wheel in the cam when in the air, a caster multi-position locking device including a brake drum segment fixed to the wheel hub and being concentric to the king pin axis, a hydraulically, as well as spring actuated piston provided with a friction pad and movable within said brake cylinder for frictional engagement with said brake drum segment, and a pressure fluid conduit connected to said brake cylinder for applying pressure against the piston to actuate the brake for arresting the castered wheel position substantially at the caster angle the wheel assumes when touching ground, however, said locking device with the hydraulic pressure released providing sufficient friction by spring action to dampen shimmying of the wheel.

2. In an airplane cross-wind landing gear, a strut having at its bottom a wheel axle attached thereto, said axle being provided at its outer end with a bore forming a caster brake cylinder, a king pin disposed at an angle with the horizontal and being axially slidable and pivotable in said axle, a hollow wheel hub fixed to said pin and being radially spaced from said axle, a wheel rotatably mounted on said hub and being freely casterable about said pin, a cam within and being seated at the bottom of said hub, a pair of cam followers fixed to the bottom of said axle in contact with said cam, a spring concentric with the king pin and seated on said axle for centering the wheel in the cam when in the air, a caster multi-position locking device including a brake drum segment fixed to the wheel hub and being concentric to the king pin axis, a piston slidably mounted in the brake cylinder, a friction pad on the piston, spring means behind the piston for normally holding the pad against the brake drum segment to dampen wheel shimmying, and a conduit for supplying fluid under pressure behind the piston to lock the wheel against castering.

3. In an airplane cross-wind landing gear, a strut having at its bottom a wheel axle attached thereto, said axle being provided at its outer end with a bore forming a caster brake cylinder, a king pin disposed at an angle with the horizontal and being axially slidable and pivotable in said axle, a hollow wheel hub fixed to said pin and being radially spaced from said axle, a wheel rotatably mounted on said hub and being freely casterable about said pin, a cam within and being seated at the bottom of said hub, a pair of cam followers fixed to the bottom of said axle in contact with said cam, a spring concentric with the king pin and seated on said axle for centering the wheel in the cam when in the air, a caster multi-position locking device including a brake drum segment fixed to the wheel hub and being concentric to the king pin axis, a piston slidably mounted in the brake cylinder, spring means behind the piston for normally holding it against the brake drum segment to dampen wheel shimmying, and a conduit for supplying fluid under pressure behind the piston to lock the wheel hub against castering.

4. In an airplane cross-wind landing gear, a strut having at its bottom a wheel axle attached thereto, said axle being provided at its outer end with a bore forming a brake cylinder, a king pin disposed at an angle with the horizontal, a hollow wheel hub mounted on said pin and being radially spaced from said axle, a wheel rotatably mounted on said hub and being casterable about the king pin axis, a caster multiposition locking device including a brake drum segment fixed to the wheel hub and being concentric to the king pin axis, a piston slidably mounted in the brake cylinder, a friction pad on the piston, spring means behind the piston for normally holding the pad against the brake drum segment to dampen wheel shimmy, and a conduit for supplying fluid under pressure behind the piston to lock the wheel hub against castering.

5. In an airplane cross-wind landing gear including a fixed wheel axle, a landing wheel hub casterably mounted to said axle, a hydraulically operated caster brake disposed between said axle and said hub, said brake consisting of a cylinder formed within the outer end of said wheel axle a pressure fluid conduit leading to said cylinder, a piston in said cylinder, a spring in back of the piston for forcing it outwardly, a friction pad seated on the piston, a pressure sealed flanged pin movable in said piston and in said pad, a spring for keeping said pin in retracted position, a brake drum segment fastened to the casterable wheel hub and being provided with a plurality of registering holes for engaging said pin, when hydraulic pressure is applied to the cylinder in back of the piston, said pin being retracted from said drum when the hydraulic pressure is released from said cylinder.

EDWARD WOLF.

References Cited in the file of this patent

UNITED STATES PATENTS

| Number | Name | Date |
|---|---|---|
| 2,006,387 | Eksergian | July 2, 1935 |
| 2,345,945 | Miner | Apr. 4, 1944 |
| 2,489,115 | Wolf | Nov. 22, 1949 |
| 2,504,077 | Loudenslager | Apr. 11, 1950 |
| 2,523,598 | Smith | Sept. 26, 1950 |
| 2,525,362 | Lucien | Oct. 10, 1950 |
| 2,554,009 | Burnelli | May 22, 1951 |
| 2,560,747 | Sievers | July 17, 1951 |

FOREIGN PATENTS

| Number | Country | Date |
|---|---|---|
| 265,650 | Great Britain | Feb. 9, 1927 |
| 704,249 | France | Feb. 17, 1931 |